United States Patent Office 3,452,449
Patented July 1, 1969

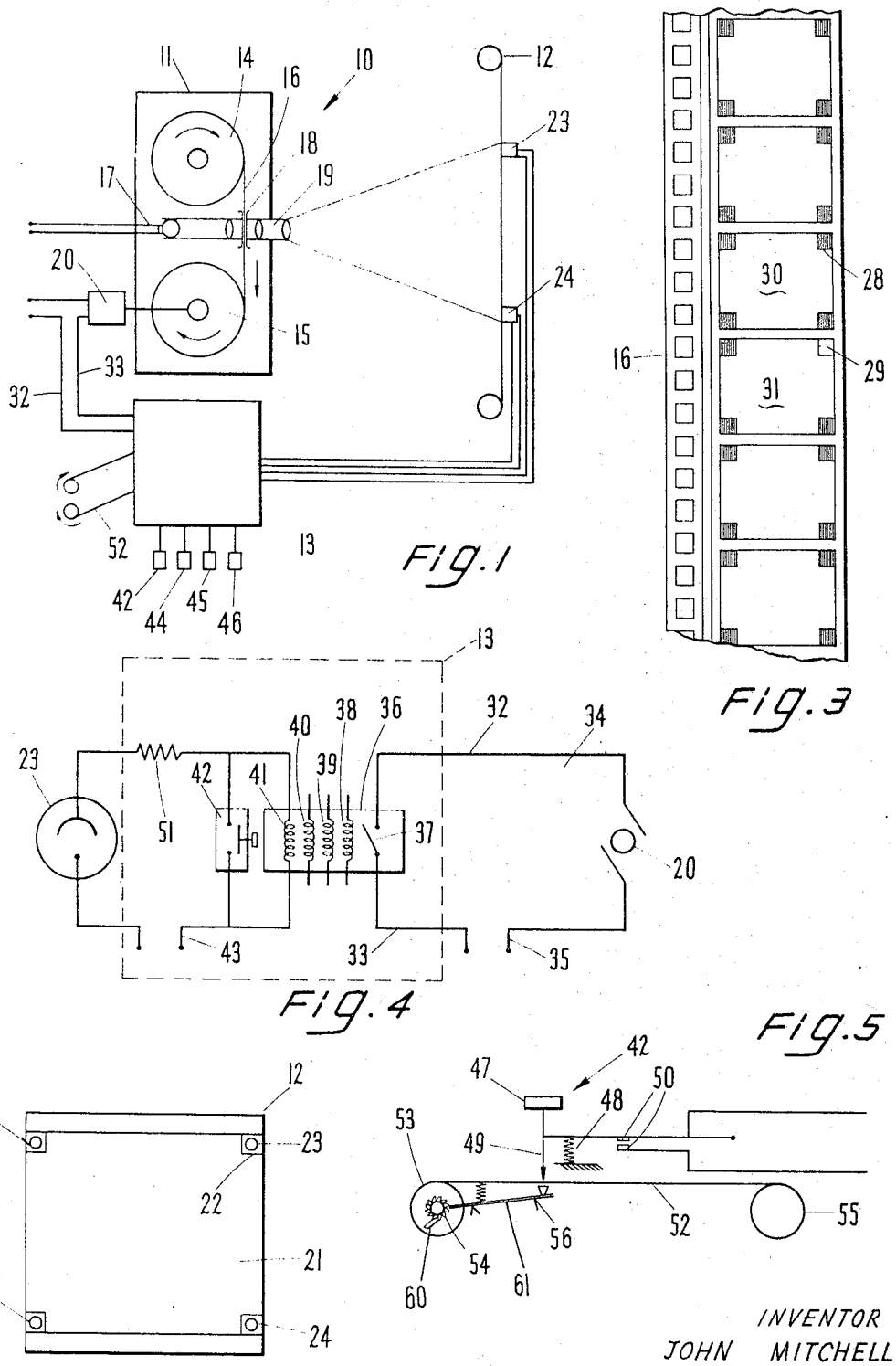

3,452,449
TEACHING AID AND METHOD
John Mitchell, Pocasset, Mass.
(35 Congress St., Room 1152, Boston, Mass. 02109)
Filed May 12, 1966, Ser. No. 549,518
Int. Cl. C09b 7/06
U.S. Cl. 35—9
6 Claims

ABSTRACT OF THE DISCLOSURE

A teaching apparatus is provided for use in conjunction with an image projector operated through an electric circuit arrangement. The apparatus comprises a projection screen, a plurality of light sensitive actuators and a plurality of student answer switches each connected with one of said actuators. A film comprising a plurality of frames at least some of which bear question and answer indicia to be answered by a student carry light transparent portions representative of correct answers keyed to the actuators in student answer switches. Means are connected to each of the light sensitive actuators for breaking the electric circuit arrangement upon actuation by the light transparent portions on the film. The means are also with the student answer switches so that activation of a student answer switch keyed to an actuated light sensitive actuator de-actuates the means and automatically completes a circuit arrangement.

---

The present invention relates to a teaching aid and method of using the aid and more particularly a means and method for programming a form of instruction which encourages students to produce answers as the program proceeds. The teaching aid is particularly designed for use with substantially conventional educational films, slides and transparencies with which images are projected in a series in conventional visual aid educational programs.

It is well known that audio-visual teaching aids have come into increased usage in the educational field in recent years. Teaching principles such as the Montessori method have indicated that learning can be advantageously accomplished by the use of as many of the five senses of a student as possible in the learning procedure. However, there have been some limitations on the use of audio-visual aids such as movie projectors. No truly effective, relatively inexpensive apparatus is currently commercially available which permits viewing of a series of images as on a movie film, automatic discontinuance of the film and reactivation or continuance of the series by selection of a correct answer from among several projected on a screen, by the student or viewer in an automatic fashion.

An important object of this invention is to provide a teaching aid which permits discontinuance of a series of projected images and automatic continuance upon selection of an aswer and simple manual manipulation to reactivate or continue said series in response to proper selection by a student or viewer.

Another object of this invention is to provide a teaching aid in accordance with the preceding object which is inexpensive and can be incorporated into a conventional movie projector and screen arrangement.

Still another object of this invention is to provide a teaching aid in accordance with the preceding objects which permits great effectiveness in combined visual and audio instruction and which is useful for students with a minimum of reading and concentration ability and training as well as students having high reading and concentration ability and training.

A still further object of this invention is to provide a novel and improved audio-visual teaching method.

According to the invention a teaching apparatus is provided for use in conjunction with an image projector operated through an electric circuit. The teaching apparatus comprises a projection screen having a preselected image projection surface area and a plurality of light sensitive actuators mounted at the image area. A plurality of on-off switches are each connected with one of the actuators. A means is provided for breaking the electric circuit upon actuation by anyone of the plurality of light senstive actuators and the means is interconnected with the on-off switches so that activation of a preselected switch connected with a preselected light actuator deactuates the means and again completes the circuit. Thus, a series of images carried on movie film can be projected and its motion stopped at a preselected frame by a light beam actuating one of the preselected actuators while a frame is projected on the screen and visually indicating a question with a series of four alternate choices. By selecting a switch corresponding to the number of the choice on the screen, a viewer indicates his answer to the question. If the correct switch is depressed, the movie projector is again started by closing of the circuit while if an incorrect answer is given as by pressing the wrong switch, the movie projector remains in its stopped position with the series of images discontinued.

According to the method of this invention, a series of educational images are projected on a screen by the use of an image-carrying means such as a motion picture film with the image-carrying means defining preselected light transparent portions keyed to positions on the screen carrying light sensitive actuators. A preselected actuator is automatically tripped on the screen at a preselected time by projection of light through one of the light transparent portions to automatically cause discontinuance of the series at a preselected portion thereof. While the image projector is stopped, questions on the stopped frame are presented to the viewers along with a selection of answers and the viewer is allowed to select an answer. The selected answer is indicated by manual manipulation of a switch keyed to the light sensitive portions and if the answer is correct, the series of images is continued as by starting of the motor of the movie projector while if the answer is incorrect, the series remains discontinued.

Other features, objects and advantages of the invention will be better understood from the following description when read in conjunction with the accompanying drawings in which:

FIG. 1 is a semi-diagramatic view of the teaching apparatus of this invention;

FIG. 2 is a front view of a projection screen useful in the preferred embodiment of this invention;

FIG. 3 is a top view of a portion of a film strip useful in accordance with the present invention;

FIG. 4 is a diagramatic representation of a circuit arrangement of the preferred embodiment of this invention; and FIG. 5 is a semi-diagramatic side view of a portion thereof.

Turning now to the drawings and more particularly FIG. 1, a teaching aid 10 is indicated comprising a conventional movie projector 11, a projection screen 12 and a teaching console 13. The teaching console 13 preferably electrically interconnects the projector 11 and the screen 12 and acts as a means by which the student or viewer can indicate an answer to questions projected on the screen at appropriate times to reactivate the projector 11 after it has been deactuated as will be described. Preferably only the motor of the projector is turned off and on and the lamp is connected to its own power supply.

The projector 11 can be any conventional movie projector or can be an automatically advancing slide projector. In the preferred embodiment, projector 11 is shown with a 16 millimeter feed reel 14 and takeup reel 15 carrying a film strip 16 on which are a series of moving picture images. The film strip 16 in accordance with conventional practice passes in front of a projection lamp 17 through suitable guides 18 and has a projection lens 19 mounted as is known. The drive means for the projector is indicated diagramatically at 20 and is a conventional motor operating the take up reel 15.

The projection screen 12 is preferably a glass beaded projection screen of a conventional type having a projection area 21 on which the educational material to be viewed is projected from the film strip 16. The image projection area of the screen is indicated by the four lines forming a generally rectangular area about portion 21 of the screen as best seen in FIG. 2. At each corner 22 of the projection area on the surface of the screen is a cutout portion at which are mounted light sensitive actuators, 23, 24, 25 and 26. The actuators 23, 24, 25 and 26 are preferably identical although different types of actuators may be employed. The actuators are preferably photoelectric cells such as Cadium Sulfide Photocells #V97–2 (Sigma Instruments) as is well known. Thus, each actuator when exposed to projected light from the projector 11 will produce an electric signal to close a circuit as is known in the art.

The film strip 16 used in the projector 11 can be a conventional film which is suitably modified for use in the invention. Corner portions 28 at all four corners of each frame are blacked out and made opaque, or, made transparent as indicated at 29, depending upon whether or not the light actuators 23, 24, 25 and 26 are to be activated as any particular frame is projected. Thus, by keying corners 28 on each frame to portions 22 of the screen suitable automatic control of the projector can be obtained. Thus, when frame 30 or preceding frames as shown in FIG. 3 pass through the projector 11, the blackened portions 28 prevent substantial amounts of light from hitting areas 22 on the screen so that the photocells are not actuated. However, when frame 31 is projected onto the screen with its transparent portion 29 permitting passage of light, keyed photocell unit 23 is activated thereby to produce an electric impulse which automatically stops the projector motor 20 permitting the frame 31 to remain projected on the screen.

Turning now to the teaching console 13, in the preferred embodiment, the teaching console is connected by suitable lines 32 and 33 to the electric circuit 34 carrying the motor 20 of the projector and a source of electrical energy such as a conventional schoolroom 110 volt power line the terminals of which are indicated at 35. The circuit 34 includes a conventional relay 36 having a spring loaded normally on, on-off contact arm 37 and a plurality of coils 38, 39, 40 and 41. Coil 41 is electrically connected in parallel with photocell 23 with switch 42 and in series with a 110 volt power source 43. A similar circuit comprising coil 40, switch 44, power source and photocell 24 is provided as are similar circuits through the photocells for coils 38 and 39 and their corresponding switches 45 and 46 respectively. All of the switches 42, 44 and 45 and 46 are preferably identical and are known in the art. A preferred embodiment of a useful switch is shown in FIG. 5 where switch 42 comprises a hold down button 47, spring loaded by spring 48 into an up off position and having a marker punch member 49 extending downwardly from the button. Upon pressing button 47 downwardly, the contacts illustrated at 50 are closed to complete a circuit through the photocell, electric supply source and a resistor 51 which is preferably provided to balance the line. Closing of contacts 50 cuts off power to the coil 41. Release of the contact button 47 automatically causes opening of the circuit and passage of current through the coil 41 if the photocell 23 has been triggered.

In the preferred embodiment, a paper tape 52 preferably underlies the punch 49 of the push button 47 as best shown in FIG. 5. The paper tape 52 is contained on a supply reel 55. Reel 53 has ratchet axle 54 mounted on suitable bearings (not shown) and is tensioned to permit passage of the tape 52 from reel 55. The reel 53 is locked against rotation by dog 60. When the marker punch 49 is depressed it indents the paper tape 52 and forces it into a socket 56 which releases the ratchet 54 and causes rotation of roll 53. When button 47 is raised the ratchet again is engaged by arm 61 and the tape movement stopped. The punch 49 preferably carries an ink supply to permanently mark the tape. Any conventional paper tape carrier can be provided underlying the punch 49 to provide a permanent record of each answer punched by a student in response to each question projected on the projection screen as will be described. The paper web 52 preferably underlies each of the switch buttons of 42, 45, 44 and 46. The paper tape can be eliminated if it is not desired to maintain a permanent record of answers.

Turning now to the operation of the teaching apparatus 10 of this invention, the projector 11 is turned on actuating motor 20 to drive reel 15 and show a series of projected images from the film strip 16. The film strip 16 may have a sound track attached thereto and the projector 11 can be provided with audio means as is well known in the art. As the film strip 16 is projected, the photocell actuators 23, 24, 25 and 26 are deactuated since the corners 28 block substantial light to the actuators. However, as frame 31 is projected on the screen 12, corner 29 permits passage of light to actuator 23 which in turn causes passage of current through coil 41 opening relay 36 as shown in FIG. 4 and cutting the circuit to the motor 20. The series of images is then discontinued and frame 31 continues to be projected on the screen 12. Preferably frame 31 carries a question relating to the subject matter of the film with four answers marked A, B, C and D corresponding to actuators 23, 24, 25 and 26 and keys 42, 44, 45 and 46 respectively of the teaching console 13.

A student or viewer is then requested by the instructor or by a sound track to select the correct answer to the question projected on the screen by punching the switch button which is keyed to the answer A, B, C or D selected by the student. If the wrong answer is selected and the wrong corresponding button pushed, as seen from the circuit arrangement of FIG. 4, the frame 31 will continue to be held on the screen. However, if the student selects the right answer to the question posed, switch 42 (or the appropriate coil) will be closed providing a bypass and droppage of current in coil 41 (or the appropriate coil) which in turn allows the relay switch 36 to close making the circuit to the electric motor 20 and again causing a continuation of the series of projected images as the film continues on the projector. The question keyed frames can be placed at any desired intervals along the film strip. Similarily, the correct answer can be keyed to any one of the four corner blocks with a series of questions provided on the film. When the paper 52 is used in conjunction with the teaching console 13, a permanent record is kept of the answers given by the student to each question posed by the film thus, incorrect answers would also be punched on the tape. The punched answers on the tape can be arranged to coincide with the numbers of the questions asked by selection of suitable spacing and advancement of the tape as is known.

While a specific embodiment of this invention has been shown and described, it should be understood that many modifications thereof are possible. For example, in some cases the circuit of the teaching console can be varied to permit actuation of the electromagnetically acting relay contact arm 37 by a single coil interconnected with each of the four light sensitive actuators. Preferably, four actuators are employed in preselected positions although any number of actuators can be used keyed to the film areas such as 28 and 29 so long as at least two are used to permit a selection of a proper answer. Two or more light transparent areas can be used on the film strip and two or more correct answers projected to permit continuance of the film travel only if the student selects cell of the correct answers. The use of a resistor can be omitted depending upon the type of light sensitive actuator used. Continuously advancing slide projectors can be interconnected with the teaching console and screen arrangement of the present invention by making suitable connections to the motor circuits thereof. The particular light sensitive actuator used can vary as is known in the art. The particular switch such as 42 illustrated in FIG. 5 can be any conventional flip-flop switch or other on-off switch with or without an attached punch or other marker means for making a permanent record of the answers given.

In view of the many modifications possible, this invention is to be limited only by the spirit and scope of the following claims.

What is claimed is:

1. A teaching apparatus for use in conjunction with an image projector operated through an electric circuit arrangement, said apparatus comprising,
a projection screen having a preselected image surface area,
a plurality of light sensitive actuators mounted at spaced positions adjacent the edge of said screen for receiving light from transparent portions of frames of a projected film,
a plurality of student answer switches each connected with one of said actuators,
a film comprising a plurality of frames at least some of which bear question and answer indicia to be answered by a student and carry said light transparent portions representative of correct answers keyed to said actuators and said student answer switches,
means connected to each of said light sensitive actuators for breaking said electric circuit arrangement upon actuation of anyone of them by said light transparent portions on said film,
said means being interconnected with said student answer switches so that activation of a student answer switch keyed to an actuated light sensitive actuator deactuates said means and automatically completes said circuit arrangement.

2. A teaching apparatus in accordance with claim 1 wherein said means for breaking said circuit arrangement comprises a relay which opens in response to actuation by one of said actuators.

3. A teaching apparatus in accordance with claim 2 wherein said relay is connected in series with a power source and a drive motor of said projector to form a first circuit in said circuit arrangement.

4. A teaching apparatus in accordance with claim 3 wherein said actuators are each electrically connected in series with a power source and with one of said student answer switches connected in parallel with a coil means for breaking said first circuit when a preselected said one student answer switch is actuated and for maintaining said first circuit open so long as said one student answer switch is deactuated or when any of the other of said student answer switches are actuated or deactuated.

5. A teaching apparatus in accordance with claim 4 wherein said projector is a movie projector and said student answer switches carry means for permanently recording each activation thereof corresponding with response to said question indicia.

6. A teaching console for use in connection with an image projector, a film having questions, answers and transparent portions, and a screen carrying a plurality of light sensitive actuators,
said console comprising a relay having at least one coil and a contact arm and a plurality of normally off, student answer on-off switches each connected in parallel with a coil of said relay for permitting opening of the contact arm of said relay when in the off position and causing closing of the contact arm when one of said switches is in the on position only if said one switch is connected with a power supply thru an actuated light sensitive actuator with both said one switch and actuator corresponding to a question and correct answer of said film.

References Cited
UNITED STATES PATENTS

| 3,117,382 | 1/1964 | Schutzberger et al. | 35—9 |
| 3,137,948 | 6/1964 | Wyckoff | 35—9 |
| 3,141,243 | 7/1964 | Chapman et al. | 35—9 |
| 3,191,315 | 6/1965 | Hannah | 35—9 |
| 3,286,372 | 11/1966 | Williams et al. | 35—9 |
| 3,344,435 | 10/1967 | Anschutz et al. | 35—9 |

FOREIGN PATENTS

| 1,386,930 | 12/1964 | France. |
| 1,415,547 | 9/1965 | France. |

EUGENE R. CAPOZIO, Primary Examiner.

W. W. NIELSEN, Assistant Examiner.